United States Patent
Marzy et al.

(10) Patent No.: US 8,307,802 B2
(45) Date of Patent: Nov. 13, 2012

(54) MASS BALANCE UNIT

(75) Inventors: Roland Marzy, Steyr (AT); Andreas Hölzl, Wieselburg (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 982 days.

(21) Appl. No.: 12/349,752

(22) Filed: Jan. 7, 2009

(65) Prior Publication Data

US 2010/0000490 A1    Jan. 7, 2010

(30) Foreign Application Priority Data

Jan. 10, 2008  (DE) .......................... 10 2008 003 809

(51) Int. Cl.
*F02B 75/06*  (2006.01)

(52) U.S. Cl. .............. 123/192.2; 123/192.1; 123/196 R; 123/198 C; 74/603; 464/180

(58) Field of Classification Search ............... 123/192.1, 123/192.2, 196 R, 198 C; 74/603; 464/180
See application file for complete search history.

(56) References Cited

U.S. PATENT DOCUMENTS

| | | | | |
|---|---|---|---|---|
| 2,253,299 A | * | 8/1941 | Howard | 192/58.9 |
| 5,535,643 A | * | 7/1996 | Garza | 74/603 |
| 6,371,071 B1 | * | 4/2002 | Iwata | 123/192.2 |
| 6,601,557 B1 | * | 8/2003 | Hayman et al. | 123/192.2 |
| 6,758,183 B2 | * | 7/2004 | Endo et al. | 123/192.2 |
| 6,772,725 B2 | * | 8/2004 | Inaba et al. | 123/192.2 |
| 6,868,816 B2 | | 3/2005 | Hiraki | |
| 7,017,545 B2 | * | 3/2006 | Sato et al. | 123/192.2 |
| 2003/0075136 A1 | * | 4/2003 | Inaba et al. | 123/192.2 |
| 2003/0106518 A1 | * | 6/2003 | Purcell et al. | 123/192.2 |
| 2003/0145821 A1 | * | 8/2003 | Hashimoto et al. | 123/192.2 |
| 2007/0079786 A1 | * | 4/2007 | Osman | 123/192.2 |
| 2007/0227476 A1 | * | 10/2007 | Tsuruta et al. | 123/41.86 |

FOREIGN PATENT DOCUMENTS

| | | |
|---|---|---|
| DE | 10 2006 02955 | 6/2006 |
| DE | 202006016109 U1 * | 4/2007 |
| EP | 1 803 906 | 7/2007 |
| JP | 4325320 A * | 11/1992 |

(Continued)

OTHER PUBLICATIONS

Machine translation of Detailed Description for DE 202006016109U1.*

(Continued)

*Primary Examiner* — Nathaniel Wiehe
*Assistant Examiner* — Grant Moubry
(74) *Attorney, Agent, or Firm* — Harness, Dickey & Pierce, P.L.C.

(57) ABSTRACT

A mass balance unit having a mass balance housing in which a mass balance shaft is rotatably journaled and a unit housing in which a drive shaft of a secondary unit is rotatably journaled. The mass balance housing is made in one piece and has a bearing section which completely surrounds a bearing opening in which the mass balance shaft is rotatably journaled. The unit housing is also made in one piece with a base section, a wall section and a bearing section. The bearing section of the unit housing completely surrounds a bearing opening in which the drive shaft is rotatably journaled. The drive shaft is operably connected to the balance shaft drivewise. The base section of the unit housing is releasably fastened to a lower side of the mass balance housing while its wall section is adjacent an end face of the mass balance housing.

25 Claims, 4 Drawing Sheets

FOREIGN PATENT DOCUMENTS

| | | |
|---|---|---|
| JP | 2003129816 | 5/2003 |
| JP | 2004144099 | 5/2004 |
| JP | 2005003089 | 1/2005 |
| JP | 2005146999 | 6/2005 |
| WO | 01/29447 | 4/2001 |

OTHER PUBLICATIONS

German Search Report (and translation).

* cited by examiner

MASS BALANCE UNIT

CROSS-REFERENCE TO RELATED APPLICATIONS

This application claims priority to and the benefit of German Patent Application No. 10 2008 003 809.1, filed Jan. 10, 2008. The disclosure of the above application is incorporation herein by reference in its entirety.

FIELD

The invention relates to a mass balance unit having an integrated secondary unit for an internal combustion engine in a motor vehicle.

BACKGROUND

The statements made in this section merely provide background information related to the present disclosure and may not constitute prior art.

Mass balance units having balance shafts have the purpose of compensating mass forces and mass torques arising in internal combustion engines. With specific engine types, for example with in-line engines having four cylinders, such balance shafts are used pair-wise, with the balance shafts rotating contrary-wise at double the crankshaft speed. The balance shafts as well as the components bearing them are subject to high load due to the high speed so that not least the stability of mass balance units is of great importance.

Such mass balance units have a mass balance housing at which the at least one mass balance shaft is rotatably journaled. A balance weight is rotationally fixedly fastened to the respective mass balance shaft and the balance shaft is in drive connection with the crankshaft of the internal combustion engine. The mass balance unit is arranged, for example, at the crankcase of the internal combustion engine or in the oil pan of the internal combustion engine.

Oil pumps are also frequently arranged in the region of the oil pan. Oil pumps serve to supply oil continuously to the internal combustion engine for lubrication and cooling purposes. This oil is typically collected in an oil pan and is sucked out of it.

It is known to integrate a mass balance unit and secondary units, for example an oil pump of the explained kind, into a common assembly. The parts and installation effort and/or cost required for this purpose is, however, undesirably high. The manufacture of such an integrated assembly is undesirably complex and expensive due to the resulting tolerance chains.

SUMMARY

It is an object of the invention to provide a mass balance unit having an integrated oil pump which can be manufactured with a small number of components and with a small installation effort and/or cost.

This object is satisfied by a mass balance unit having a mass balance housing in which at least one mass balance shaft is rotatably journaled and a unit housing in which at least one drive shaft of a secondary unit is rotatably journaled. The mass balance housing is made in one piece such that the mass balance housing has at least one bearing section which surrounds a bearing opening peripherally in one piece in which the mass balance shaft is rotatably journaled. The unit housing is also made in one piece with at least one base section, a wall section and a bearing section such that the bearing section of the unit housing surrounds a bearing opening peripherally in one piece in which the drive shaft is rotatably journaled. The drive shaft is operably connected to the balance shaft drivewise. The base section of the unit housing is releasably fastened to a lower side of the mass balance housing. The wall section of the unit housing is arranged at an end face of the mass balance housing.

The mass balance unit in accordance with the invention has a one-piece mass balance housing for the journaling of the at least one mass balance shaft. In other words, in the mass balance housing, a division plane is avoided which extends along the axis of the respective balance shaft and thus extends through the bearing openings. The bearing sections of the mass balance housing are in particular also made in one piece with a connection section connecting them so that a spacing between the bearing sections is fixed. The bearing sections of the mass balance housing then form an indivisible unit together. The mass balance housing is hereby particularly stable with respect to the journaling of the respective balance shaft and a plurality of housing parts do not have to be installed next to one another.

The unit housing is also made in one piece with a bearing section for a drive shaft, with a base section of the unit housing being associated with the lower side of the mass balance housing (with respect to a position of use of the mass balance unit) and with a wall section of the unit housing being associated with an axial end face of the mass balance housing (with respect to the axis of rotation of the at least one balance shaft). The drive shaft journaled in the named bearing section is operably connected to the balance shaft drivewise which is journaled in the mass balance housing. The drive shaft can hereby be driven by the balance shaft.

The unit housing is fastened to the lower side of the mass balance housing in an untypical manner via its base section. Since both the mass balance housing and the unit housing are each made in one piece and separately from one another, a particularly favorable tolerance chain hereby results in the vertical direction with respect to the drive connection between the balance shaft and the drive shaft. A first vertical measure defines the spacing of the axis of the balance shaft from the lower side of the mass balance housing. A second vertical measure defines the spacing of the axis of the drive shaft from the lower side of the mass balance housing. Since these two vertical measures are calculated from the same reference plane—namely from the lower side of the mass balance housing—and since these two vertical measures are additionally calculated in the same direction—namely vertically upwardly—a minimal tolerance chain is present with respect to the vertical orientation of the balance shaft and of the drive shaft. The individual tolerances of the mass balance housing and of the unit housing thus do not have to be kept particularly small. The manufacture of the named housings is hereby simplified and the manufacturing costs decrease accordingly.

A particular advantage of the mass balance unit in accordance with the invention comprises the fact that a simple installation is made possible by the releasable connection of the base section of the unit housing to a lower side of the mass balance housing. Construction space is in particular at a premium in the region of the engine provided for the mass balance unit. An installation/servicing of the unit housing from below is less complex and/or costly. In addition, the unit housing can also be installed after the installation of the mass balance housing without any substantial installation clearance having to be provided to the side of the mass balance housing. This is of particular importance if the mass balance housing is made in one piece with an oil pan and is arranged in its inner space since in this case less construction space is usually available for installation purposes in the axial direction.

An additional advantage results when the mass balance housing has a housing opening at the lower side which can admittedly simplify the installation of the mass balance unit in an advantageous manner, but which can result in an unwanted oil foaming, namely if the balance weight fastened to the balance shaft dips into the oil on its rotation. With such an arrangement, the named base section of the unit housing can close the housing opening of the mass balance housing at the lower side to minimize oil foaming effects, with the base section of the unit housing, for example, only having a suction opening for the oil supply.

It must also be noted in connection with the invention that the named unit housing does not necessarily have to take up all the components of the secondary unit, for example of an oil pump. The drive shaft is, however, at least journaled in the bearing section of the unit housing. The named one-piece design of this unit housing also does not mean that further housing parts cannot be provided, for example a unit housing cover which is fastened to the wall section of the unit housing at a side disposed opposite the mass balance housing.

The base section and the mass balance housing preferably have flange surfaces—in particular flange surfaces made planar, i.e. extending substantially in one plane—for the fastening of the unit housing to the mass balance housing which are arranged offset to an axis of rotation of the mass balance shaft in a radial direction. The flange surface of the base section and/or of the mass balance housing can have at least one groove which forms a passage extending along the flange surface for the conveying of lubricant. A lubricant conveying passage is thereby formed in a simple manner together with the respective other flange surface. The passage extending along the flange surface is in particular connected in an installed state of the mass balance unit via a lubricant passage, which is formed in a bearing section of the mass balance housing, to a respective bearing opening for the mass balance shaft, whereby a reliable and constructionally simple lubrication of the balance shaft can be ensured.

At least one balance weight and at least one drive wheel are preferably rotationally fixedly fastened to the named balance shaft of the mass balance unit. The drive wheel can provide an operative connection to the crankshaft of the internal combustion engine drivewise or the drive wheel effects an operative connection to a further mass balance shaft drivewise, with in particular two drive wheels being able to be fastened to the respective balance shaft for the named purposes.

Provision can be made that the mass balance shaft and the drive shaft are arranged coaxially. It can, however, be advantageous for specific applications if the mass balance shaft and the drive shaft are arranged in parallel offset to one another. The operable connection of the mass balance shaft and of the drive shaft drivewise can in both alternatives include a transmission which is in particular made as a spur gear, for example to realize a specific transmission of the torque of the balance shaft driving the drive shaft and/or to bridge the described parallel offset between the shafts. It is furthermore possible that the operative connection of the mass balance shaft and of the drive shaft drivewise includes a clutch device. Such a clutch device serves inter alia to compensate smaller angular errors or coaxial errors of the axes of rotation of the mass balance shaft and of the drive shaft. The additional loads acting on the drive shaft are thereby also kept small. The clutch in particular includes a dihedral connection, a gear shaft connection or a bevel gear connection. To compensate alignment errors, the clutch can additionally or alternatively be made at least in part from elastomeric material.

In accordance with an advantageous further development, the mass balance housing is simultaneously made in one piece with an oil pan which is fastened to the lower side of the crankcase of the internal combustion engine and which has an oil collection section at the lower side or a fastening section at the lower side for the fastening of an oil pan base. In other words, the oil pan anyway usually provided can simultaneously form the named one-piece mass balance housing so that the at least one balance shaft is ultimately directly journaled in the oil pan and the named one-piece unit housing is ultimately fastened to a section of the oil pan. The number of the required housing parts is hereby still further reduced. At the same time, the weight and the required construction space of the total arrangement of oil pan, mass balance unit and secondary unit are reduced.

The invention also relates to a method for the installation of a mass balance unit having an integrated secondary unit of the kind explained above wherein the following steps are carried out: installing at least one mass balance shaft at a one-piece mass balance housing; installing at least one drive shaft at a one-piece unit housing which has at least one base section and one wall section; and fastening the base section of the unit housing to a lower side of the mass balance housing, wherein the wall section of the unit housing is arranged at an end face of the mass balance housing and wherein an operative connection of the drive shaft to the balance shaft drivewise is established.

Two preinstallable units are thus provided which are finally connected to one another. A particularly simple manufacturing method hereby results for a mass balance unit with an integrated secondary unit which moreover has the advantages explained above.

Provision is made in accordance with a further development of this method that the following steps are carried out for the installation of the mass balance shaft at the one-piece mass balance housing: at least one balance weight and/or at least one drive wheel is/are arranged in the mass balance housing and is/are held there; the balance shaft is introduced into the mass balance housing in the axial direction and is guided through a fastening opening of the balance weight or through a fastening opening of the drive wheel; the balance weight or the drive wheel is fastened rotationally fixedly to the balance shaft.

It is particularly advantageous if this fastening of the balance weight or of the drive wheel to the balance shaft is made as a shrink fit connection.

DRAWINGS

The invention will be described in the following only by way of example with reference to the drawings. Elements which are the same or of the same kind are marked by the same reference numerals therein.

Figure 4:
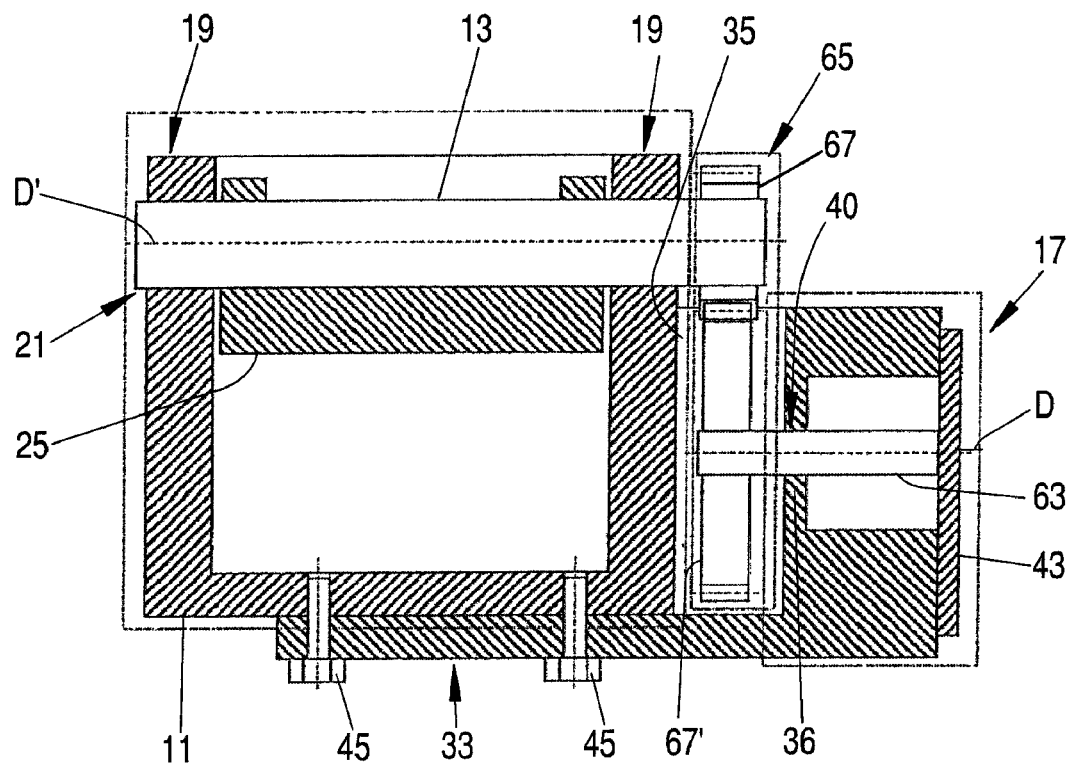
Figure 5A:
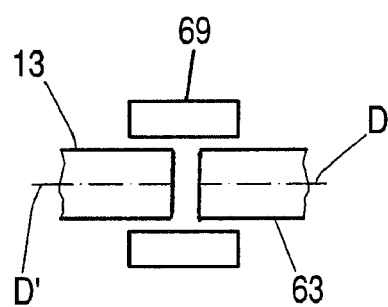
Figure 5B:
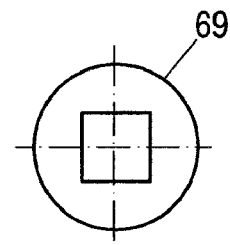

FIG. 4 schematically shows a third embodiment of a mass balance unit with an integrated oil pump in a longitudinal section; and FIGS. 5a and 5b show views of a clutch for the operative connection of a balance shaft and a drive shaft of the oil pump drivewise.

DETAILED DESCRIPTION

The following description is merely exemplary in nature and is not intended to limit the present invention, its applications and/or its uses.

Figure 1:
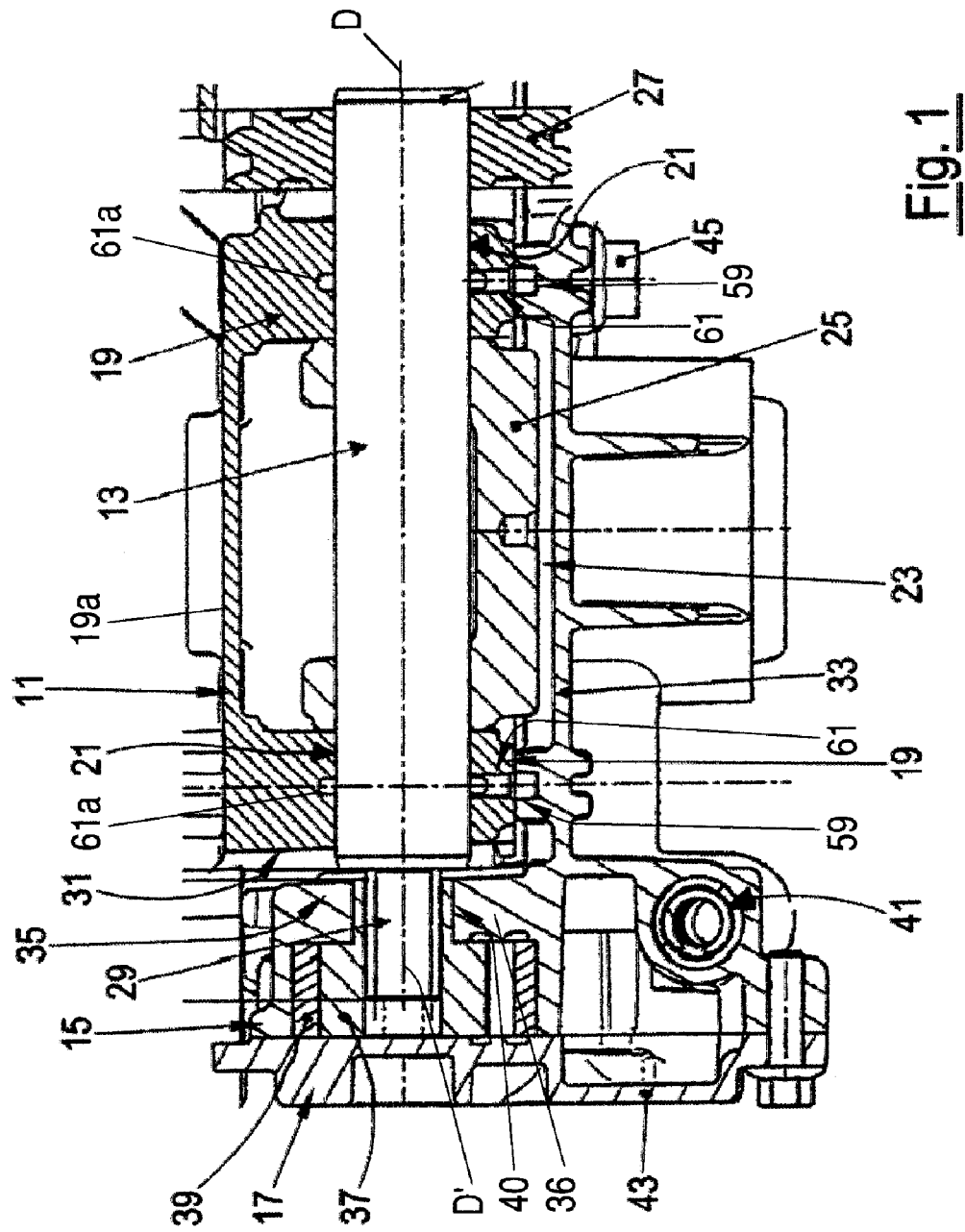
FIG. 1 shows a first embodiment of a mass balance unit with an integrated oil pump in a longitudinal view.

FIG. 1 shows a mass balance unit having an integrated secondary unit. In particular, the mass balance unit has a mass balance housing 11 in which a mass balance shaft 13 is rotatably journaled and a pump housing 15 in which an oil pump 17 is received, for example of the type of a so-called gerotor pump. The oil pump 17 is integrated into the mass balance unit, i.e. no separate drive is provided for the oil pump 17, but the drive rather takes place via the balance shaft 13.

The mass balance housing 11 is made in one piece and has two bearing sections 19 which completely surround a respective bearing opening 21 peripherally in one piece. The bearing sections 19 are made in one piece with a web-like connection section 19a so that their spacing is fixed relative to one another. The balance shaft 13 is journaled in the bearing openings 21, with alternatively to the representation in accordance with FIG. 1, additional bearing sleeves being able to be provided. The mass balance housing 11 has a housing opening 23 at the lower side between the bearing sections 19. A balance weight 25 is fastened rotationally fixedly and axially fixedly to the balance shaft 13 between the bearing sections 19. The end face of the bearing sections 19 respectively facing the balance weight 25 serves as a run-on surface so that the balance shaft 13 is simultaneously axially journalled at the bearing sections 19 via the balance weight 25.

A gear 27 is rotationally fixedly and axially fixedly installed on the balance shaft 13 at an end of the balance shaft 13 projecting out of the mass balance housing 11. The balance shaft 13 is driven to a rotary movement around an axis of rotation D by means of the gear 27. The gear 27 is for this purpose connected operably drivewise either directly or indirectly via a further balance shaft to the crankshaft of the respective internal combustion engine. The mass balance shaft 13 has at the end disposed opposite the gear 27 an axial prolongation 29 which projects beyond the associated end face 31 of the mass balance housing 11.

The named pump housing 15 is likewise made in one piece and it has a base section 33 and a wall section 35 which extend substantially perpendicular to the base section 33. In the position of use of the mass balance unit shown in FIG. 1, the base section 33 extends substantially along a horizontal plane and the wall section 35 of the pump housing 15 extends substantially along a vertical plane.

An inner rotor 37 and an outer rotor 39 of the oil pump 17 are rotatably journalled in the wall section 35 of the pump housing 15. The inner rotor 37 is rotationally fixedly connected to the axial prolongation 29 of the mass balance shaft 13. The inner rotor 37 forms a drive shaft of the oil pump 17 and a region of the wall section 35 of the pump housing 15 forms a bearing section 36 having a bearing opening 40 in which the drive shaft (inner rotor 37) is rotatably journaled. The inner rotor 37 of the oil pump 17 can thus be driven by driving the balance shaft 13 by means of the gear 27 to a rotary movement around an axis of rotation D' (here identical to the axis of rotation D).

A pressure relief valve 41 is, for example, received in an extension section of the named wall section 35 of the pump housing 15 at the lower side. The wall section 35 of the pump housing 15 is closed by means of a pump housing cover 43 at a side disposed opposite the mass balance housing 11.

The pump housing 15 is only fastened to the mass balance housing 11 via its base section 33, and indeed via corresponding fastening screws 45 which cooperate with the lower side of the mass balance housing 11. The base section 33 of the pump housing 15 hereby closes the named housing opening 23 of the mass balance housing 11 at the lower side.

Since the mass balance housing 11 is made in one piece with the bearing sections 19 of the mass balance housing 11, the mass balance housing 11 has a great stability, which is of advantage with respect to the journaling of the balance shaft 13 with the balance weight 25 fastened thereto. Since in addition the pump housing 15 is likewise made in one piece with the base section 33, with the wall section 35 and with the bearing section 36, the mass balance unit shown has an advantageously small number of components. Since the pump housing 15 is fastened to the lower side of the mass balance housing 11 via the base section 33, the installation of the mass balance unit is particularly simple and the tolerance chains to be observed on the production and installation of the individual components 11, 15 are advantageously short with respect to the vertical alignment of the axis of the balance shaft 13, on the one hand, and with respect to the axis of rotation of the inner rotor 37 of the oil pump 17, on the other hand.

The concentricity of the axis of the balance shaft 13 to the axis of rotation of the inner rotor 37 is namely defined by the following component tolerances. First, the spacing of the respective center of the bearing openings 21 of the mass balance housing 11 from the screw-on surface of the mass balance housing 11 at the lower side has to be taken into account. Second, the spacing of the center of the bearing opening 40 for the rotors 37, 39 provided in the pump housing 15 from the corresponding screw-on surface of the base section 33 of the pump housing 15 has to be taken into account. The alignment of the named axes of the balance shaft 13 and of the inner rotor 37 can take place via suitable fitting screws, fitting sleeves or fitting pins in the transverse direction—that is in the horizontal direction with respect to the position of use shown in FIG. 1.

Since the base section 33 of the pump housing 15 closes the housing opening 23 of the mass balance shaft 11 at the lower side, oil foaming which can otherwise be generated by the rotating balance weight 25 is largely minimized.

Figure 2:
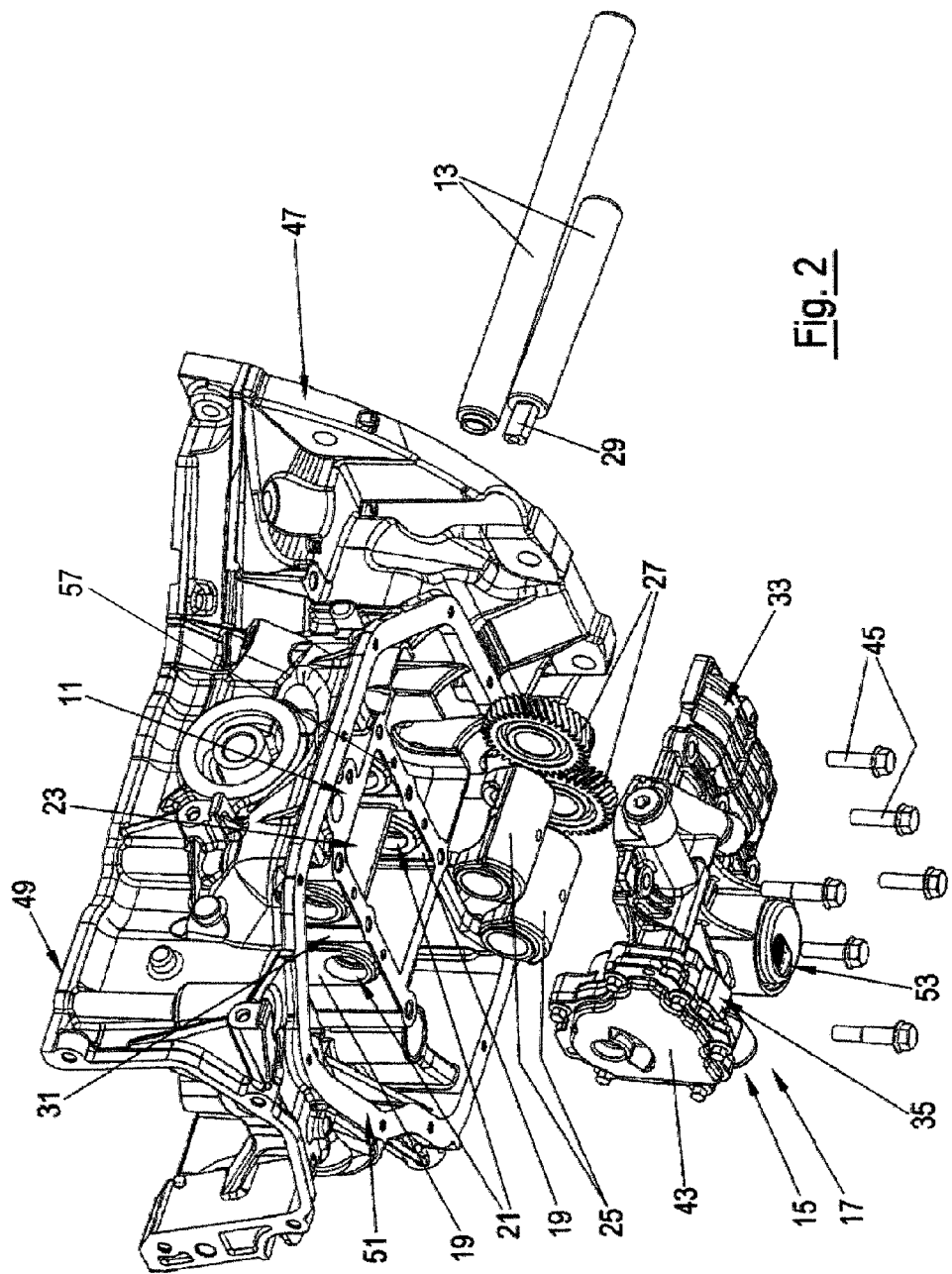
FIG. 2 shows a second embodiment in an exploded view from obliquely below.

The embodiment in accordance with FIG. 2 is very similar to the embodiment in accordance with FIG. 1. It can be seen from FIG. 2 that the mass balance housing 11 is made in one piece with an oil pan 47. The oil pan 47 has a fastening section at the upper side—namely a fastening flange 49—for the fastening of the oil pan 47 to the crankcase of the respective internal combustion engine. The oil pan 47 additionally has a fastening section at the lower side—namely a fastening flange 51—for the fastening of an associated oil pan base (not shown). This oil pan base forms an oil collection region of the oil pan 47 at the bottom side into which a suction opening 53 projects which is formed at the base section 33 of the pump housing 15.

As can furthermore be seen from FIG. 2, the mass balance unit shown therein has two mass balance shafts 13 in a parallel arrangement, with the two balance shafts 13 being operably connected to one another via the gears 27 drivewise.

An advantageous method for the installation of the mass balance unit in accordance with FIG. 1 or in accordance with FIG. 2 will now be explained.

In a first installation step, the respective mass balance shaft 13 is installed at the mass balance housing 11. In a second installation step, the inner rotor 37, the outer rotor 39 and any further components of the oil pump 17 are installed at the pump housing 15. In a third installation step, the base section 33 of the pump housing 15 is fastened to the lower side of the mass balance housing 11 (for example pushed on in the horizontal direction and then fixed in the vertical direction).

The three named installation steps can also be carried out in a different order. For example, the named first installation step and the second installation step can be swapped over. It is, for example, also possible that the named third installation step is carried out before the second installation step, i.e. the one-piece pump housing is first fastened to the lower side of the mass balance housing and only then are the inner rotor 37 and the outer rotor 39 inserted in the axial direction into the wall section 35 of the pump housing 15. Ultimately, however, the wall section 35 of the pump housing 15 is always located at the axial end face 31 of the mass balance housing 11 and a rotationally fixed connection of the inner rotor 37 is thus established to the axial prolongation 29 of the balance shaft 13.

To install the respective balance shaft 13 at the mass balance housing 11 in accordance with the named first installation step, provision is preferably made that the associated balance weight 25 and the associated gear 27 are arranged in alignment with the bearing openings 21 in the mass balance housing 11 and are held there. The respective balance shaft 13 is subsequently guided in the axial direction through a respective fastening opening of the balance weight 25 and of the gear 27 and is introduced into the bearing openings 21 of the bearing sections 19 of the mass balance housing 11. For this purpose, the oil pan 47 shown in FIG. 2 can have suitable shaft introduction openings in alignment with the bearing openings 21. After the respective balance shaft 13 has in this manner adopted the desired axial position, the associated balance weight 25 and the associated gear 27 are fastened to the balance shaft 13.

This fastening can in particular be effected via a shrink fit connection. For this purpose, the respective balance shaft 13 can be cooled before the introduction into the mass balance housing 11. Alternatively or additionally, the respective balance weight 25 and the respective gear 27 are heated and the bearing sections 19 of the mass balance housing 11 are preferably also heated. After the introduction of the balance shaft 13 into the mass balance housing 11, the named parts 11, 13, 25, 27 are held in the desired position relative to one another for so long until a mutual temperature equalization has taken place. The balance weight 25 and the gear 27 are thus securely fastened to the balance shaft 13 and the balance shaft 13 can also be securely journaled in the bearing openings 21 of the bearing sections 19 in this manner.

A simple and fast installation method results overall hereby with a minimum number of required components.

Figure 3:
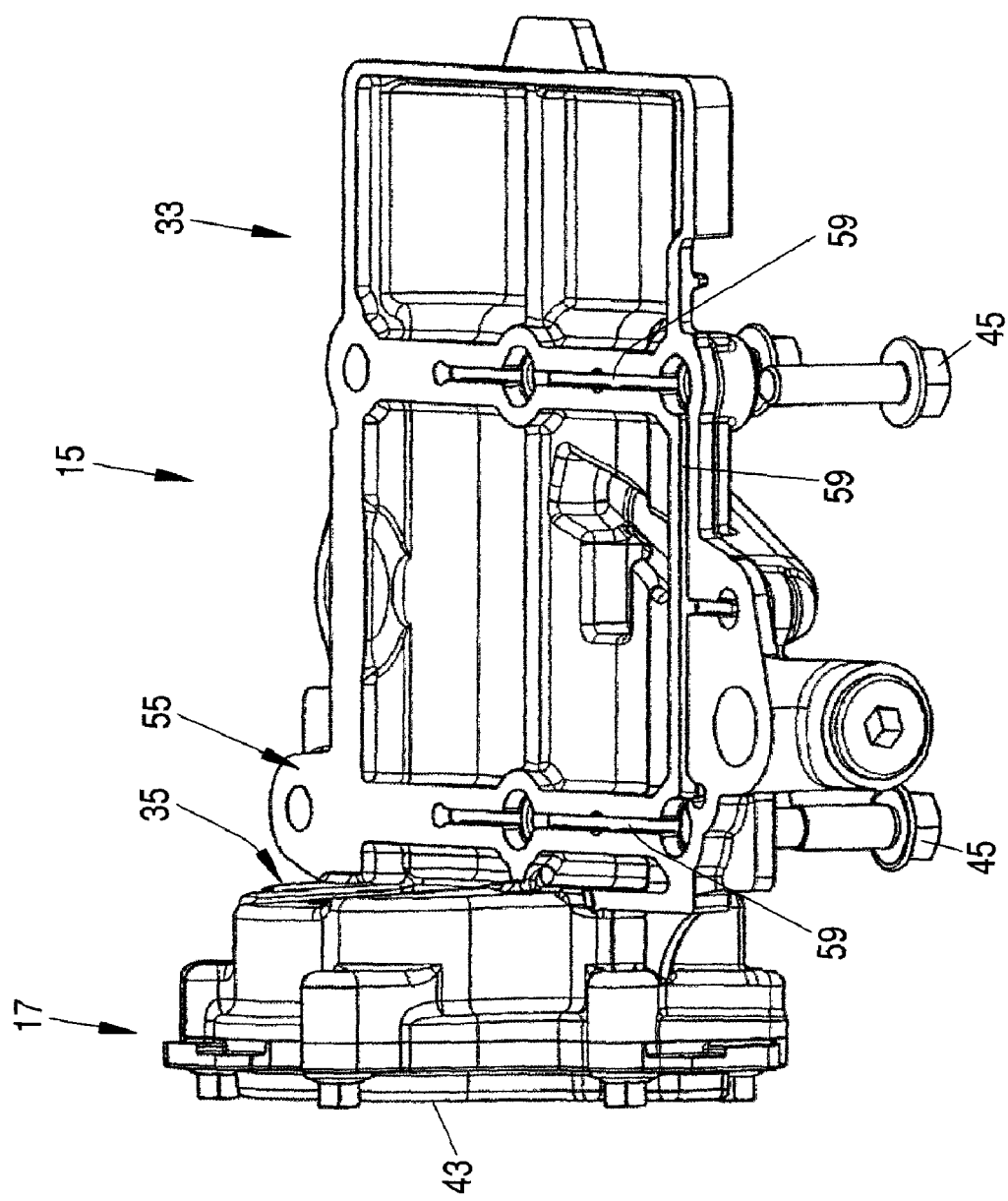
FIG. 3 shows a pump housing in a view from obliquely above.

FIG. 3 shows the pump housing 15 of FIG. 2 from a view from obliquely above. In addition to the components already known from FIG. 2, in particular the upper side of the base section 33 can easily be recognized. It has a pump housing flange 55 which substantially extends in one plane. The pump housing flange 55 serves for the fastening of the pump housing 15 to the mass balance housing 11 which has a corresponding mass balance housing flange 57 (see FIG. 2) for this purpose.

Passage-like grooves 59 are provided in the surface of the pump housing flange 55 for the conveying of lubricant to the balance shaft 13. They are in contact via lubricant bores with an outlet opening in the base section 33 through which they are supplied with lubricant. In the installed state, the mass balance housing flange 57 forms the cover of the grooves 59.

The mass balance housing flange 57, however, likewise has lubricant bores 61 which extend through the bearing sections 19 up to the bearing openings 21 (see FIG. 1). Ring grooves 61a in communication with the lubricant bores 61 are provided in the bearing openings 21 to distribute the lubricant in the total region of the bearing openings 21. Such passage-like grooves can alternatively or additionally also be provided at the associated mass balance housing flange 57.

FIG. 4 shows a schematic representation of a further embodiment of a mass balance unit in accordance with the invention. In contrast to the embodiments described above, the axis of rotation D' of the oil pump 15 and the axis of rotation D of the mass balance shaft 13 are not arranged coaxially, but rather are offset in parallel. The mass balance shaft 13 drives a drive shaft 63 of the oil pump 17 via a transmission 65 which is formed by two meshing spur gears 67, 67' which are rotationally fixedly connected respectively to the balance shaft 13 and the drive shaft 63. A transmission 65 can generally also be used with a coaxial arrangement.

FIGS. 5a and 5b show in a longitudinal section and a transverse section respectively a clutch 69 for the connection of two substantially coaxially extending shafts, for example the balance shaft 13 and the drive shaft 63 (differing from the embodiment shown in FIG. 4). Such a clutch 69 is suitable for the compensation of smaller defects in the relative alignment of the individual components of the mass balance unit. Alignment errors can, for example, be deviations from a parallel arrangement of the shafts 13, 63 as well as an offset of the shafts in the direction of the axes of rotation and/or perpendicular thereto. The clutch 69 can, for instance, include a dihedral connection, a gear shaft connection or a bevel gear connection. The clutch 69 shown has a quadratic inner cross-section which cooperates in a shape matched manner with correspondingly designed ends of the balance shaft 13 and the drive shaft 63 to enable an efficient torque transmission. If the clutch 69 is made from an elastomer, the alignment errors described above are compensated by a slight deformation of the clutch 69. A rigid clutch 69 can be suitable if it is a case of connecting too large a spacing of otherwise coaxially correctly aligned shaft ends of the balance shaft 13 and of the drive shaft 63.

The description is merely exemplary in nature and, as such, variations that do not depart for the gist of the present disclosure are intended to be within the scope of the invention. Such variations are not to be regarded as a departure from the spirit and scope of the present invention.

REFERENCE NUMERAL LIST 11 mass balance housing
13 mass balance shaft
15 pump housing
17 oil pump
19 bearing section
19a connection section
21 bearing opening
23 housing opening
25 balance weight
27 gear
29 prolongation
31 end face
33 base section
35 wall section
36 bearing section
37 inner rotor
39 outer rotor
40 bearing opening 41 pressure relief valve
43 pump housing cover
45 fastening screw
47 oil pan
49 fastening flange
51 fastening flange
53 suction opening
55 pump housing flange
57 mass balance housing flange
59 groove
61 lubricant bore
61a ring groove
63 drive shaft
65 transmission
67, 67' spur gear
69 clutch
D, D' axis of rotation

The invention claimed is:

1. A mass balance unit having an integrated secondary unit for an internal combustion engine of a motor vehicle, comprising:
    a mass balance housing in which at least one mass balance shaft is rotatably journaled and a unit housing in which at least one drive shaft of the secondary unit is rotatably journaled, wherein the mass balance housing is made in one piece and has at least one bearing section which completely surrounds a bearing opening in which the mass balance shaft is rotatably journaled;
    wherein the unit housing is also made in one piece and integrally includes at least one base section, a wall section and a bearing section which completely surrounds a bearing opening in which the drive shaft is rotatably journaled;
    wherein the drive shaft is operably connected drivewise to the balance shaft;
    wherein the base section of the unit housing is releasably fastened to a lower side of the mass balance housing, the base section of the unit housing and the mass balance housing having flange surfaces for fastening the unit housing to the mass balance housing and which are arranged in a radial direction offset to an axis of rotation of the mass balance shaft; and
    wherein the wall section of the unit housing is arranged at an end face of the mass balance housing.

2. The mass balance unit in accordance with claim 1, wherein the mass balance housing has a housing opening at the lower side, with the base section of the unit housing closing the housing opening of the mass balance housing at the lower side.

3. The mass balance unit in accordance with claim 1, wherein the unit housing is only fastened to the mass balance housing via the base section.

4. The mass balance unit in accordance with claim 1, wherein the unit housing is only fastened to the lower side of the mass balance housing.

5. The mass balance unit in accordance with claim 1, wherein the wall section of the unit housing extends substantially perpendicular to the base section of the unit housing.

6. The mass balance unit in accordance with claim 1, wherein, in the position of use of the mass balance unit, the base section of the unit housing extends substantially along a horizontal plane and the wall section of the unit housing extends substantially along a vertical plane.

7. The mass balance unit in accordance with claim 1 wherein at least one of the flange surface of the base section and the flange surface of the mass balance housing has at least one groove which forms a passage extending along the flange surface for the conveying of lubricant.

8. The mass balance unit in accordance with claim 7, wherein the passage is in communication with the bearing opening of the mass balance housing via a lubricant passage which is formed in the bearing section of the mass balance housing.

9. The mass balance unit in accordance with claim 1, wherein a unit housing cover is fastened to a side disposed opposite the mass balance housing at the wall section of the unit housing.

10. The mass balance unit in accordance with claim 1, wherein the mass balance shaft and the drive shaft are arranged coaxially.

11. The mass balance unit in accordance with claim 1, wherein the mass balance shaft and the drive shaft are arranged in parallel offset to one another.

12. The mass balance unit in accordance with claim 1, wherein the operative drivewise connection of the mass balance shaft and the drive shaft includes a transmission which includes a spur gear.

13. The mass balance unit in accordance with claim 1, wherein the operable drivewise connection of the mass balance shaft and the drive shaft includes a clutch device.

14. The mass balance unit in accordance with claim 1, wherein a pressure restricting valve is arranged in the unit housing.

15. The mass balance unit in accordance with claim 1, wherein the mass balance housing is made in one piece with an oil pan which has a fastening section at an upper side for the fastening of the oil pan to a crankcase of the internal combustion engine and at least one of an oil collection section at a lower side and a fastening section at the lower side for the fastening of an oil pan base.

16. The mass balance unit in accordance with claim 1, wherein at least one balance weight and at least one drive wheel are rotationally fixedly connected to the mass balance shaft.

17. The mass balance unit in accordance with claim 1, wherein two mass balance shafts are rotatably journaled in the mass balance housing, and are arranged parallel to one another and operably drivewise connected to one another drivewise.

18. The mass balance unit in accordance with claim 1, wherein the secondary unit is an oil pump.

19. A mass balance unit for an internal combustion engine, comprising:
    a one-piece mass balance housing having an integral first bearing section defining a first bearing opening;
    a balance shaft rotatably journaled in the first bearing opening of the mass balance housing; and
    a secondary unit mounted to the mass balance housing and including a one-piece unit housing and a drive shaft rotatably driven by the balance shaft, the unit housing having a base section and a traversely extending wall section defining an integral second bearing section having a second bearing opening within which the drive shaft is rotatably journaled, wherein the base section is releaseably secured to a lower side of the mass balance housing and the wall section is disposed adjacent an end face of the mass balance housing unit, the base section of the unit housing and the mass balance housing having flange surfaces for securing the unit housing to the mass balance housing and which are arranged offset in a radial direction relative to an axis of rotation of the balance shaft.

20. The mass balance unit in accordance with claim 19 wherein the mass balance housing defines a housing opening through which the balance shaft extends and which is closed by the base section of the unit housing upon securing of the unit housing to the mass balance housing.

21. The mass balance unit in accordance with claim 20 wherein the unit housing is only secured to the mass balance housing via the base section, and wherein at least one of the flange surfaces associated with the base section of the unit housing and the mass balance housing defining a lubrication groove.

22. The mass balance unit in accordance with claim 21 wherein the lubrication groove is in communication with a lubricant passage formed in the first bearing section of the mass balance housing for providing lubricant to the balance shaft in the first bearing opening.

23. A mass balance unit associated with an internal combustion engine, comprising:
- a one-piece mass balance housing defining a pair of laterally-spaced bearing sections each having a bearing opening, a connection section interconnecting upper portions of the bearing sections, and a housing opening located between lower portions of the bearing sections;
- a balance shaft rotatably journalled in the bearing openings and having its ends projecting out of the bearing sections;
- a balance weight fixed for rotation with the balance shaft between the bearing sections;
- a gear fixed for rotation to a first end of the balance shaft;
- a drive member fixed for rotation to a second end of the balance shaft; and
- a secondary unit mounted to the mass balance housing and including a unit housing and a driven member, the unit housing having a base section and a traversely extending wall section defining a bearing section with a bearing opening, the driven member is coupled for rotation with the drive member and is rotatably journalled in the bearing opening of the unit housing, wherein the base section is releaseably secured to a lower side of the mass balance housing to enclose the housing opening, the base section of the unit housing and the mass balance housing having flange surfaces for securing the unit housing to the mass balance housing and which are aligned in a radial direction offset relative to a rotary axis of the balance shaft, and wherein the wall section is disposed adjacent an end face of the mass balance housing.

24. The mass balance unit in accordance with claim 23 wherein the mass balance housing is formed integrally with an oil pan of the engine.

25. The mass balance unit in accordance with claim 23 wherein the secondary unit is an oil pump, wherein the unit housing is a one-piece pump housing, and wherein the driven member is a pump component driven in response to rotation of the balance shaft.

* * * * *